United States Patent [19]

Toyama

[11] Patent Number: 5,778,869
[45] Date of Patent: Jul. 14, 1998

[54] WIRE SAW SLICING APPARATUS AND SLICING METHOD USING THE SAME

[75] Inventor: Kohei Toyama, Shirakawa, Japan

[73] Assignee: Shin-Etsu Handotai Co., Ltd., Tokyo, Japan

[21] Appl. No.: 656,423

[22] Filed: May 30, 1996

[30] Foreign Application Priority Data

Jun. 1, 1995 [JP] Japan .................................. 7-134962

[51] Int. Cl.$^6$ .................................................. B28D 1/08
[52] U.S. Cl. ........................................ 125/16.02; 83/651.1
[58] Field of Search ............................ 125/16.01, 16.02, 125/21; 83/651.1, 812, 647

[56] References Cited

U.S. PATENT DOCUMENTS

| | | | |
|---|---|---|---|
| 5,269,285 | 12/1993 | Toyama et al. | 125/16.02 |
| 5,377,568 | 1/1995 | Hauser | 83/651.1 |
| 5,575,189 | 11/1996 | Kiuchi et al. | 125/16.02 |
| 5,616,065 | 4/1997 | Egglhuber | 125/16.02 |

FOREIGN PATENT DOCUMENTS

| | | |
|---|---|---|
| 0 549 893 | 7/1993 | European Pat. Off. . |
| 0 552 663 | 7/1993 | European Pat. Off. . |
| 62-251063 | 10/1987 | Japan . |
| 5220723 | 8/1993 | Japan .................................. 125/21 |

*Primary Examiner*—Robert A. Rose
*Attorney, Agent, or Firm*—Nikaido, Marmelstein, Murray & Oram LLP

[57] ABSTRACT

A slicing method of the type using a wire saw slicing apparatus including a plurality of main rollers rotatably supported at their opposite ends by pairs of bearing units and parallel spaced at predetermined intervals, and a wire wound spirally over and around the main rollers at a predetermined pitch so as to form a number of laterally spaced lines of wire stretched across a slicing zone defined between two adjacent ones of the main rollers, in which a workpiece such as a silicon semiconductor single crystal ingot is sliced into wafer-like pieces as it is forced against the lines of wire running across the slicing zone while the main rollers are rotating, with a slurry continuously supplied to the lines of wire in the slicing zone, characterized in that the main rollers are displaced in the axial direction while the workpiece is being sliced. With this axial displacement of the main rollers, the wafers as sliced from the workpiece have a controlled amount of "sori" (warp or bow). The slicing method is carried out by a wire saw slicing machine including means for displacing the main rollers in the axial direction while the workpiece is being sliced.

21 Claims, 5 Drawing Sheets

WIRE SAW SLICING APPARATUS AND SLICING METHOD USING THE SAME

BACKGROUND OF THE INVENTION

1. Field of the Invention

The present invention relates to a wire saw slicing apparatus capable of cutting off or slicing a workpiece, such as a silicon semiconductor single crystal ingot, into wafer-like slices with a controlled degree of "sori" (warp or bow) positively induced during cutting operation, and a method of slicing a workpiece using such wire saw slicing apparatus.

2. Description of the Related Art

In the manufacture of semiconductors, a silicon semiconductor single crystal ingot grown by a single-crystal pulling system is cut off or sliced into wafer-like pieces or slices by an inner diameter saw slicing machine movable along a plane perpendicular to the axis of the ingot.

The recent large-diameter trend of semiconductor wafers increases the difficulty in applying the conventional inner diameter saw slicing machine to the ingot slicing work or operation. Furthermore, the slicing method using such inner diameter saw slicing machine can only cut off one wafer at a time and, hence, is inefficient and low in productivity.

With the foregoing difficulties in view, an intense interest has been shown toward a slicing method in which a wire saw (multi-wire saw, in particular) is used. In this slicing method, a workpiece is cut off or sliced into wafer-like slices by forcing it against a wire wound spirally over and around a plurality of main rollers while a slurry is continuously supplied to a contact point between the workpiece and the wire running around the main rollers. According to this slicing method, a large number of wafers (hundreds of wafers, for example) can be cut off at one time.

The foregoing wire saw slicing method, however, has a problem that a pair of bearing units rotatably supporting or journalizing opposite ends of each of the main roller undergoes thermal expansion due to frictional heat generated between the bearing units and the rotating main roller.

On the other hand, epitaxial wafers used for fabricating bipolar integrated circuits (ICs) are produced by forming, under CVD (chemical vapor deposition) process, an epitaxial layer containing n-type impurities and grown by a predetermined thickness over the surface of a mirror-polished silicon wafer (600 to 700 μm in thickness) sliced from an n-type silicon single crystal rod heavily doped with antimony, an n-type impurity. In the fabrication of power ICs, epitaxial wafers are used, which include an epitaxial layer containing an n-type impurity, such as phosphorus or antimony, and grown at a predetermined thickness over the surface of a heavily boron-doped p-type wafer.

In the foregoing epitaxial layer growth methods, however, since the n-type impurity in the epitaxial layer containing phosphorus or antimony at a high concentration has a greater lattice constant than the boron-doped layer, an as-grown epitaxial wafer is likely to have a deformation of "sori" (warp or bow) with its convex side formed on the surface of the epitaxial layer. The "sori" (warp or bow) of the wafer tends to become greater as the IC fabrication process goes on. Due to the deformation of "sori" (warp or bow), various problems arise in the conveyance of the epitaxial wafer or in a subsequent photolithography process of the epitaxial wafer. For example, the deformed wafer cannot be properly held by vacuum clutching, nor can it be set on an aligner.

It may be considered that the amount of "sori" (warp or bow) induced in the epitaxial wafer can be controlled by preparing an as-sliced wafer having a convex or concave surface at its one side over which an epitaxial layer is subsequently grown.

One possible method of realizing the foregoing consideration comprises the use of an inner diameter saw slicing machine, which is, however, low in efficiency, as previously described. The productivity can be improved by the use of a wire saw slicing machine. However, no means has been developed for the purpose of providing a desired amount of "sori" (warp or bow) to wafers as they are sliced on the wire saw slicing machine.

SUMMARY OF THE INVENTION

With the foregoing drawbacks of the prior art in view, it is an object of the present invention to provide a wire saw slicing apparatus which is capable of slicing a workpiece such as a silicon semiconductor single crystal ingot into wafers having a controlled degree of "sori" (warp or bow), and a slicing method using the wire saw slicing machine.

To attain the foregoing object, the present invention provides a method of slicing a workpiece of the type using a wire saw slicing apparatus including a plurality of main rollers rotatably supported at their opposite ends by pairs of bearing units and parallel spaced at predetermined intervals, and a wire wound spirally over and around the main rollers at a predetermined pitch so as to form a number of laterally spaced lines of wire stretched across a slicing zone defined between two adjacent ones of the main rollers, in which the workpiece is sliced into wafer-like pieces as it is forced against the lines of wire running across the slicing zone while the main rollers are rotating, with a slurry continuously supplied to the lines of wire in the slicing zone, wherein the improvement comprises: displacing the main rollers in the axial direction while the workpiece is being sliced.

With this axial displacement of the main rollers, the workpiece can be sliced into a plurality of wafer-like pieces each having a deformation of "sori" (warp or bow).

The main rollers are displaced in the axial direction under the effect of thermal expansion of at least one of the pair of bearing units of each main roller caused due to frictional heat generated while the main rollers are rotating.

Preferably, the amount of axial displacement of the main roller is measured by a displacement detecting means and the measured axial displacement is used for regulating the temperature of said one bearing unit to control the thermal expansion of the same such that the measured amount of axial displacement is equal to a predetermined amount of axial displacement.

As a preferred alternative, the temperature of said one bearing unit of each main roller is measured for regulating the temperature of the measured bearing unit according to the correlation between the measured temperature and a corresponding thermal expansion such that the amount of axial displacement of the main roller is equal to a predetermined amount of axial displacement.

It is preferable that the temperature of said one bearing unit is regulated by a temperature regulating means composed of cooling water supplied to said one bearing unit via a control valve.

The present invention further provides a wire saw slicing apparatus of the type including a plurality of main rollers rotatably supported at their opposite ends by pairs of bearing units and parallel spaced at predetermined intervals, and a wire wound spirally over and around the main rollers at a predetermined pitch so as to form a number of laterally spaced lines of wire stretched across a slicing zone defined between two adjacent ones of the main rollers, the lines of wire being reciprocally movable upon rotation of the main rollers to slice a workpiece into wafer-like pieces as the workpiece is forced against the lines of wire in the slicing zone with a slurry continuously supplied to the lines of wire, wherein the improvement comprises: axial displacing means for displacing each of the main rollers in the axial direction while the workpiece is being sliced.

In one preferred form, the axial displacing means includes temperature regulating means for regulating the temperature of one of the pair of bearing units of each of the main rollers. The axial displacing means further includes displacement detecting means for detecting an axial displacement of the corresponding main roller.

In another preferred form, the axial displacing means includes first temperature regulating means for regulating the temperature of one of the pair of bearing units of each of the main rollers. In addition to the first temperature regulating means, the axial displacing means further includes second temperature regulating means for regulating the other of the pair of bearing units of a corresponding one of the main rollers, and displacement detecting means for detecting an axial displacement of the corresponding main roller.

As another preferred alternative, the axial displacing means includes temperature regulating means for regulating the temperature of one of the pair of bearing units of each of the main rollers. The axial displacing means further includes temperature detecting means for detecting the temperature of said one bearing unit.

In yet another preferred form, the axial displacing means includes first temperature regulating means for regulating the temperature of one of the pair of bearing units of each of the main rollers. In addition to the first temperature regulating means, the axial displacing means further includes second temperature regulating means for regulating the other of the pair of bearing units of a corresponding one of the main rollers, and temperature detecting means for detecting the temperature of, at least, said one bearing unit of the corresponding main roller.

The axial displacing means may be provided on one of the pair of bearing units of each of the main rollers in which instance the other bearing unit of the same main roller is provided with means for absorbing an axial displacement the same main roller. The axial displacement absorbing means may include an arrangement in which a shaft of the main roller is axially slidably mounted on the other bearing unit. As an alternative, the absorbing means may comprise a portion of the frame on which the other bearing unit is mounted, this portion being relatively low in stiffness and deflectable to absorb the axial displacement of the main roller.

The temperature regulating means is preferably composed of means for supplying a coolant to a corresponding one of the pair of bearing units, and a control valve for regulating the amount of the coolant supplied to the corresponding bearing unit. The coolant used in the present invention is preferably cooling water or other cooling fluid. A typical example of the workpiece is a semiconductor single crystal ingot.

In general, if a coolant is not supplied to the main rollers of the wire saw slicing apparatus, the bearing units of the main rollers will generate heat due to friction and thereby cause the main rollers to thermally expand in the axial direction. The axial thermal expansion of the main rollers exerts negative influence on the dimensional accuracy (thickness variation) and cross-sectional shape [deformation such as "sori" (warp or bow)] of as-sliced wafers.

In view of this, the conventional wire saw slicing machine generally supplies a coolant such as cooling water to a pair of bearing portions or units of each of the main rollers so as to maintain the bearing units at substantially the same temperature. To this end, one coolant supply hole or inlet is provided on each side of plural main rollers for supplying the cooling water therefrom to the respective bearing units at that side of the main rollers to uniformly cool all the bearing units down to the same temperature as the cooling water. Owing to this uniform cooling, all the bearing units have the same temperature and hence the main rollers are free from thermal expansion with the result that as-sliced wafers are independent from thickness variation and deformation such as "sori" (warp or bow).

The exothermic phenomenon appearing at each of the bearing units of the main rollers has conventionally been considered as having negative effect on the shape of as-sliced wafers. However, according to the present invention, this exothermic phenomenon is utilized positively in order to control a degree or amount of "sori" (warp or bow) on the as-sliced wafers. To this end, a control valve is provided for each of a pair of bearing portions or units of a corresponding one of plural main rollers for controlling the amount of a coolant supplied to the corresponding bearing unit. The bearing units at one end of the main rollers are supplied with a fixed amount of a coolant, whereas the bearing units at the other end of the main rollers are either supplied with a smaller amount of a coolant than those at the one end, or isolated from the coolant, i.e., no coolant is supplied to the bearing units at the other end of the main rollers.

In order to determine the amount of a coolant to be supplied to the bearing units at the other end of the main rollers, an axial displacement of each main roller is detected while the wire saw slicing apparatus is operating under no-load condition. The amount of axial thermal expansion of the main rollers, namely, axial displacement of the main rollers, caused due to a difference in amount of the supplied coolant, can be controlled by adjusting the respective openings of the control valves to regulate the amount of the supplied coolant according to a desired amount of "sori" (warp or bow) on the as-sliced wafers in such a manner that the main rollers are axially displaced by 10 µm at the maximum when as-sliced wafers having a maximum amount of "sori" (warp or bow) of 10 µm are desired.

The amount of supply of a coolant and the axial displacement of the main rollers has a certain correlation. It is, therefore, possible to regulate the amount of supply of a coolant according to the axial displacement of the main rollers or the temperature of the bearing portions which is detected by a suitable detecting means or sensor. According to the present invention, a large number of wafers can be sliced at one time from the workpiece, however, the sliced wafers have an accurately controlled degree of "sori" (warp or bow) and hence are able to meet the desired qualities.

The above and other objects, features and advantages of the present invention will become manifest to those versed in the art upon making reference to the detailed description and the accompanying sheets of drawings in which preferred structural embodiments of the invention are shown by way of illustrative example.

DETAILED DESCRIPTION OF THE INVENTION

The present invention will be described below in greater detail with reference to a first embodiment shown in FIGS. 1 through 3.

Figure 2:
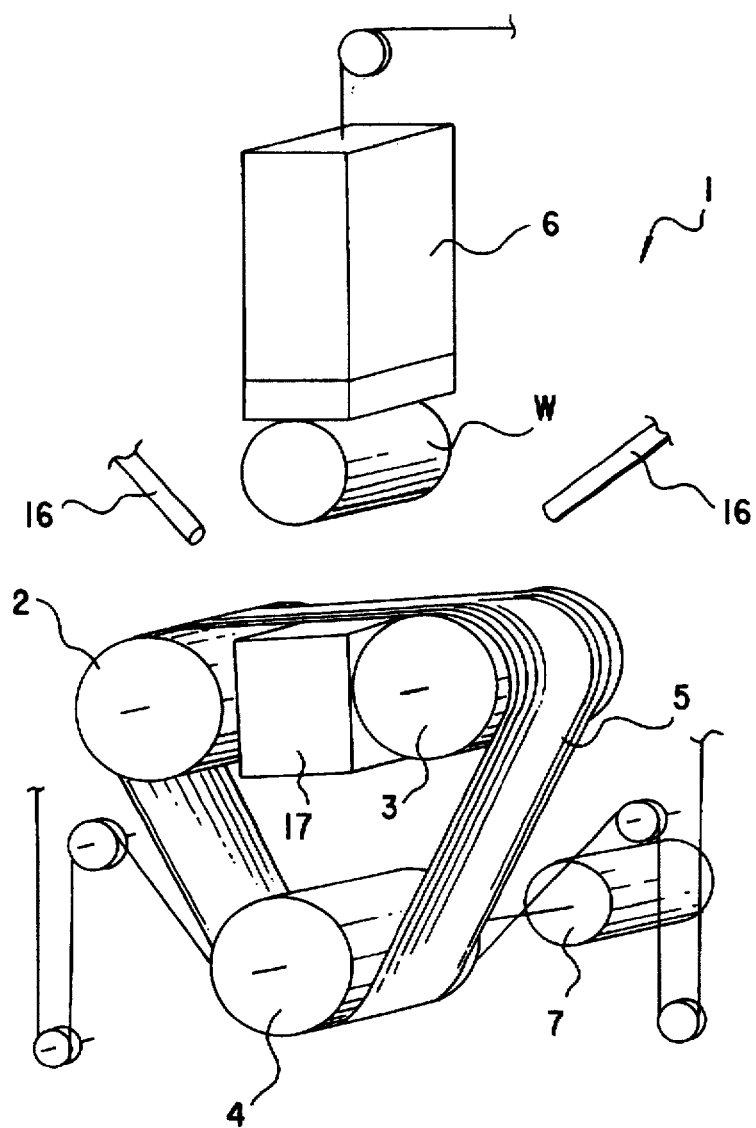
FIG. 2 is a diagrammatical perspective view of a main portion of the body of the wire saw slicing apparatus.

As shown in FIG. 2, a wire saw slicing apparatus according to the first embodiment of this invention includes a body 1 having three main rollers 2, 3, 4 parallel spaced from one another and rotatably supported at respective positions corresponding to apexes of an inverted triangle. A single wire 5 is wound spirally over and around the main rollers 2–4 at a predetermined pitch, the wire 5 being composed of a special piano wire having a diameter of about 0.08 to about 0.25 mm. The main rollers may be plural in number and should by no means be limited to any particular number, but three as in the illustrated embodiment or four main rollers are used in general.

The upper two main rollers 2, 3 define therebetween a cutting or slicing zone, and a workpiece W, such as a single crystal ingot, held on a work holder 6 is disposed above the slicing zone. The workpiece W is vertically movable toward and away from the slicing zone as the work holder 6 is moved in the vertical direction by a suitable drive means, not shown.

The lower main roller 4 is a drive main roller and driven in the forward and reverse directions by a drive motor 7.

Figure 3:
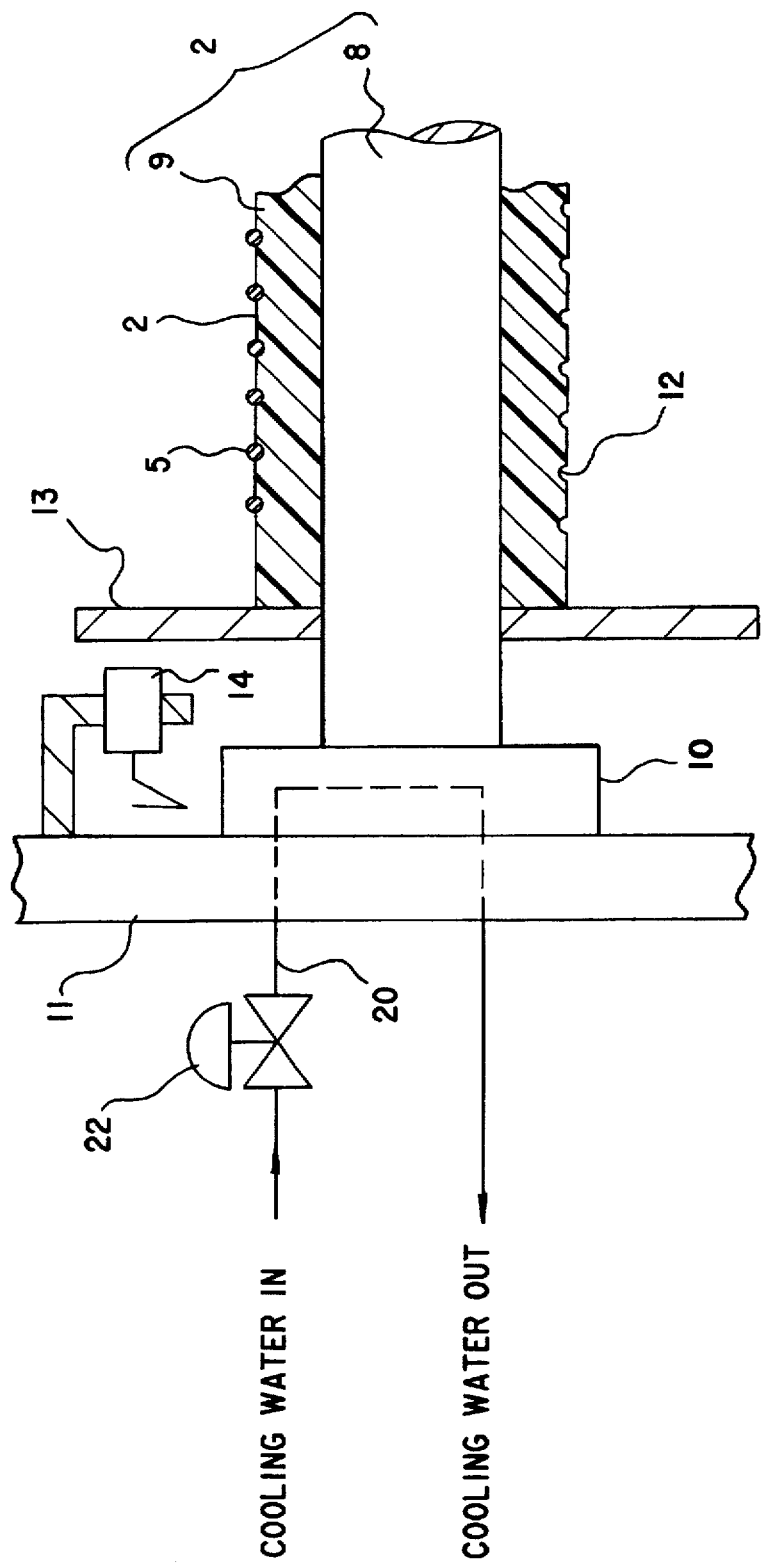
FIG. 3 is a side view, with parts in cross section, of an end portion of one main roller of the wire saw slicing apparatus.

As shown in FIG. 3, the main roller 2 is composed of a cylindrical core bar or shaft 8 made of cast iron, and a hollow cylinder 9 molded of synthetic resin and press-fitted over the core bar 8. The core bar 8 is rotatably supported at each end on a frame 11 of the body 1 via a bearing portion or unit 10.

The synthetic resin hollow cylinder 9 has a spiral groove 12 threaded around its outer peripheral surface at a predetermined pitch (a desired wafer thickness+a cutting thickness). The wire 5 wound around the main roller 2 is snugly received in the spiral groove 12. In FIG. 3 only the construction of one end of the main roller 2 is shown, however, the other end of the main roller 2 and each end of the remaining main rollers 3 and 4 are the same in construction as the end of the main roller 2 shown in FIG. 3 and further description about the construction of non-illustrated ends of the main rollers can, therefore, be omitted.

As is also shown in FIG. 3, the main roller 2 has a ring-like measurement plate 13 attached to an end of the synthetic resin hollow cylinder 9. The measurement plate 13 is made of metal such as structural steel of the class SS41 or stainless steel of the class SUS316. An eddy current non-contact displacement detecting means or sensor 14 is attached to the body frame 11 at a position near the measurement plate 13.

Referring back to FIG. 2, there are shown two nozzles 16 disposed above the main rollers 2, 3, respectively, for ejecting a stream of slurry (abrasive fluid) 15 (FIG. 4) toward a slicing point, and a slurry reservoir 17 disposed between the main rollers 2 and 3 for receiving therein the slurry 15 falling from the slicing zone. The slurry 15 is a mixed solution of lapping abrasives and lapping fluid and it is stored in a slurry tank, not shown.

As shown in FIG. 3, the body frame 11 and the bearing unit 10 are equipped with a coolant pipe, for example, a cooling water pipe 20 for circulating a coolant, for example, cooling water through the bearing unit 10. Designated by 22 is a control valve mounted in the pipe 20 at a suitable position upstream of the bearing unit 10 for regulating the amount of the cooling water supplied to the bearing unit 10 in order to control the temperature of the same bearing unit 10 which will generate heat upon rotation of the main rollers 2–4.

Figure 1:
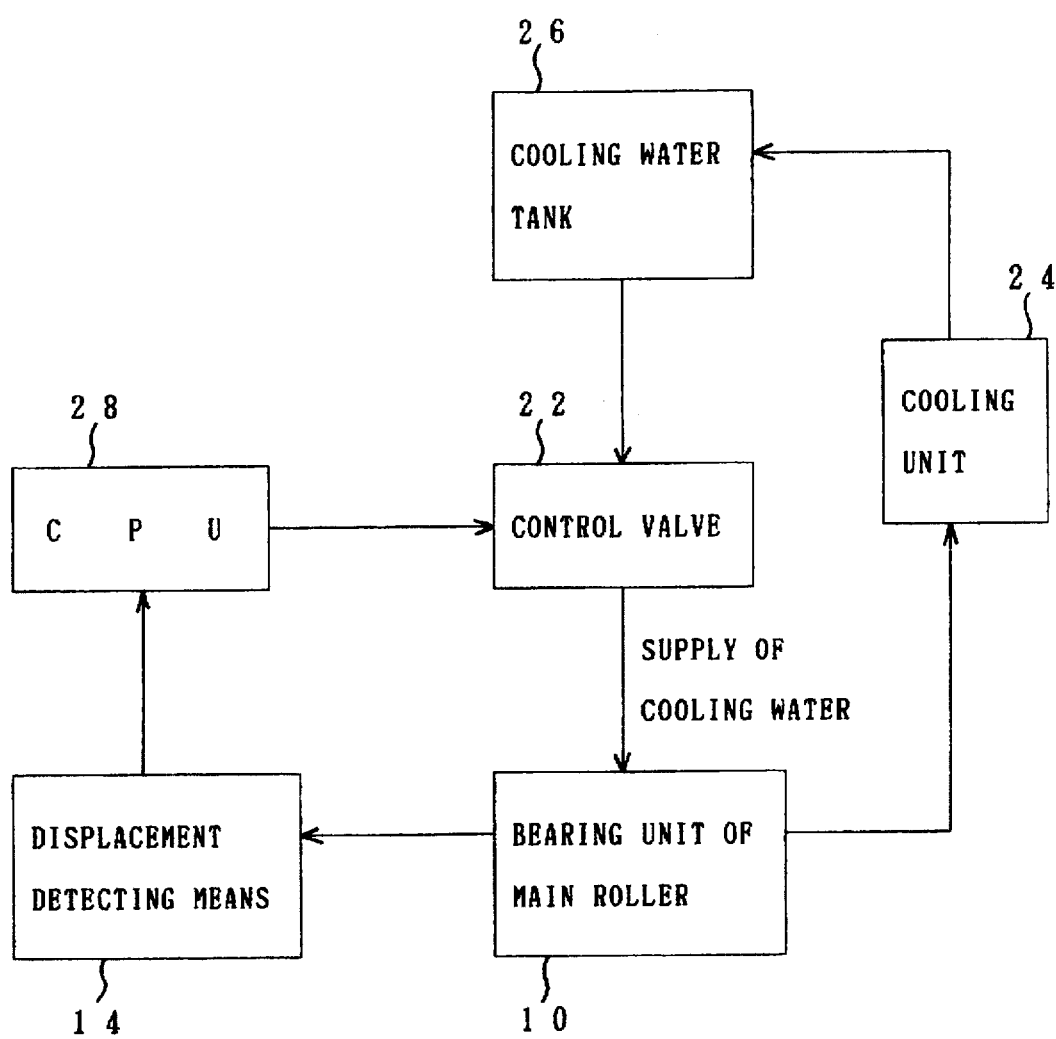
FIG. 1 is a block diagram showing one example of the construction of a wire saw slicing apparatus according to the present invention.

The cooling water used for cooling the bearing unit 10 is discharged into a cooling unit 24 shown in FIG. 1. In the cooling unit 24, the discharged cooling water is cooled again and stored in a cooling water tank 26. The cooling water stored in the cooling water tank 26 is supplied through the cooling water pipe 20 to the bearing unit 10 via the control valve 22 according to demand.

In FIG. 1, reference numeral 28 denotes a central processing unit (CPU) which operates to regulate the opening of the control valve 22 according to a detected signal from the displacement sensor 14 representing the amount of axial displacement of the measurement plate 13 and hence of the main roller 2, thereby regulating the amount of cooling water supplied to the bearing unit 10. With this regulation or adjustment of the supply of cooling water to the bearing unit 10, it is possible to adjust the temperature of the bearing unit 10 and the resulting axial displacement of the main roller 2.

The wire saw slicing apparatus of the foregoing construction will operate as follows.

A workpiece W held on the work holder 6 of the apparatus body 1 is lowered toward the slicing zone defined between the main rollers 2 and 3 and then forced against a portion of the wire 5 stretched between the main rollers 2, 3 across the slicing zone. Under such condition, the drive motor 7 is energized to rotate the drive main roller 4 alternately in the forward and reverse directions, and at the same time, the slurry 15 is supplied from the nozzles 16 onto a contact point between the workpiece W and the wire 5.

Figure 4:
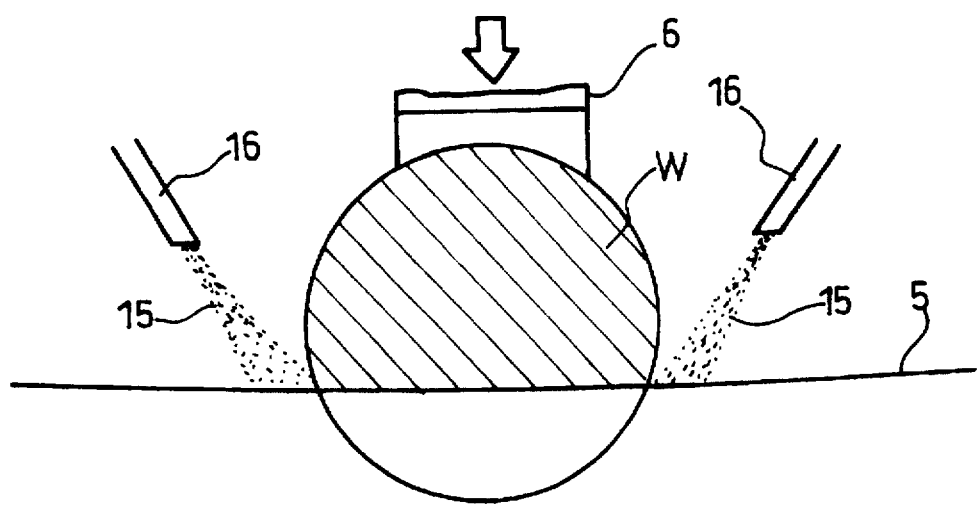
FIG. 4 is a diagrammatical cross-sectional view illustrative of the manner in which a workpiece is sliced.

As the operation proceeds, the workpiece W is gradually lapped off by a lapping action of the reciprocating wire 5 and the slurry 15, as shown in FIG. 4, and finally a number of wafers of a predetermined thickness are cut off or sliced at one time from the workpiece W.

Now, description will be given of the manner in which the temperature of one of the pair of bearing units 10 of each main roller 2, 3, 4 is adjusted while the other bearing unit 10 is kept at a reference temperature.

While the wire saw slicing apparatus is operating to cut off or slice the workpiece W, the other bearing unit 10 of each of the main rollers 2–4 is maintained at a fixed temperature because a predetermined amount of cooling water is supplied to the other bearing unit 10. On the contrary, the amount of cooling water supplied to the one bearing unit 10 of each main roller 2, 3, 4 is so controlled as to allow the associated main roller 2, 3, 4 to displace in an axial direction by a predetermined distance due to thermal expansion of the one bearing unit 10. The other bearing unit 10 while being kept at the given temperature is provided with a suitable mechanism, such as a slide mechanism, for taking up or absorbing the axial displacement of the main roller 2, 3, 4.

For instance, when operation to slice the workpiece W begins, the one bearing unit 10 and the other bearing unit 10 are supplied with the same amount of cooling water, so that no axial displacement takes place in either main roller. Then, the amount of cooling water supplied to the one bearing unit 10 of each main roller 2, 3, 4 is gradually reduced, and at the midpoint of the slicing operation, the amount of cooling water supplied to the one bearing unit 10 is reduced to a minimum or zero. Thereafter, the amount of cooling water supplied to the one bearing unit 10 is gradually increased in such a way that at the end of the slicing operation, both of the bearing units 10 are supplied with the same amount of cooling water.

Owing to the foregoing regulation of the supplied cooling water, the axial displacement of each main roller 2, 3, 4 is controlled such that the amount of axial displacement is zero at the beginning of the slicing operation, then gradually increases as the slicing operation proceeds and reaches to a maximum value at the midpoint of the slicing operation, thereafter gradually decreases with the progress of the slicing operation, and finally returns to zero at the end of the slicing operation. As a consequence of the foregoing slicing operation, the as-sliced wafers have an arcuately curved shape having a certain amount of "sori" (warp or bow).

Figure 5:
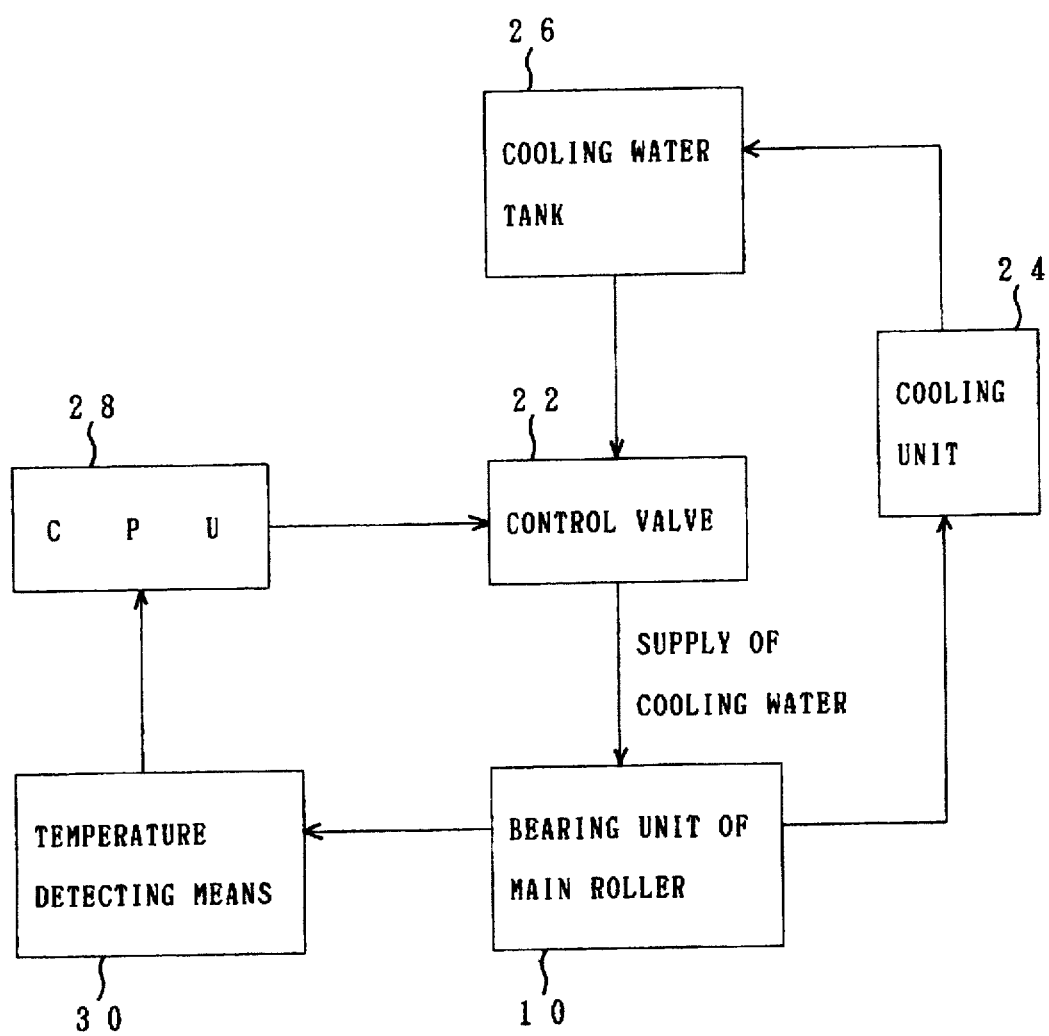
FIG. 5 is a block diagram showing another example of the construction of the slicing apparatus according to the present invention.

In the embodiment shown in FIG. 1, the axial displacement of each main roller which appears in the vicinity of the bearing unit 10 is detected by the displacement detecting means or sensor 14. It is also possible, according to the present invention, to regulate the amount of cooling water supplied to each bearing unit 10 by way of direct detection of the temperature of the bearing unit 10 using a temperature detecting means or sensor 30, such as shown in FIG. 5.

The temperature sensor 30 may be provided either on a selected one of the pair of bearing units 10, or alternatively on the both bearing units 10. In the former case, the other bearing unit is continuously cooled at a reference temperature to make it possible to regulate the amount of cooling water supplied to the one bearing unit according the difference between the detected temperature of the one bearing unit and the reference cooling temperature. In the latter case, since the temperature of both bearing units is detected, the amount of cooling water supplied to the one bearing unit is adjusted according to the difference in temperature between the two bearing units.

As described above, according to the present invention, the amount of cooling water supplied to a bearing unit of each main roller is regulated to adjust the temperature of the bearing unit for causing the main roller to displace in the axial direction by a controlled distance with the result that a workpiece such as a silicon semiconductor single crystal ingot can be cut off or sliced into wafer-like pieces having a controlled amount of bow or curvature.

In the above embodiments, cooling water is used as a preferable coolant but other cooling fluid such as cooling oil or the like is also usable.

Obviously, various minor changes and modifications of the present invention are possible in the light of the above teaching. It is therefore to be understood that within the scope of appended claims the invention may be practiced otherwise than as specifically described.

What is claimed is:

1. A method of slicing a workpiece of the type using a wire saw slicing apparatus including a plurality of main rollers rotatably supported at opposite ends thereof by pairs of bearing units and parallel spaced at predetermined intervals, and a wire wound spirally over and around the main rollers at a predetermined pitch so as to form a number of laterally spaced lines of wire stretched across a slicing zone defined between two adjacent ones of the main rollers, in which the workpiece is sliced into wafers as the workpiece is forced against the lines of wire running across the slicing zone while the main rollers are rotating, with a slurry continuously supplied to the lines of wire in the slicing zone, wherein the improvement comprises: controllably displacing the main rollers in the axial direction while the workpiece is being sliced.

2. A method according to claim 1, wherein the workpiece is sliced into a plurality of wafers each having a bow-shaped deformation which is induced during slicing operation due to axial displacement of the main rollers.

3. A method according to claim 1, wherein each of the main rollers is displaced in the axial direction under the effect of thermal expansion of at least one of the pair of bearing units caused due to frictional heat generated while the main rollers are rotating.

4. A method according to claim 3, wherein the amount of axial displacement of the main roller is measured by a displacement detecting means and the measured axial displacement is used for regulating the temperature of said one bearing unit to control the thermal expansion of the same such that the measured amount of axial displacement is equal to a predetermined amount of axial displacement.

5. A method according to claim 3, wherein the temperature of said one bearing unit of each main roller is measured for regulating the temperature of the measured bearing unit according to the correlation between the measured temperature and a corresponding thermal expansion such that the amount of axial displacement of the main roller is equal to a predetermined amount of axial displacement.

6. A method according to claim 4, wherein the temperature of said one bearing unit is regulated by a temperature regulating means composed of a coolant supplied to said one bearing unit via a control valve.

7. A method according to claim 5, wherein the temperature of said one bearing unit is regulated by a temperature regulating means composed of a coolant supplied to said one bearing unit via a control valve.

8. A method according to claim 6, wherein the coolant is cooling water.

9. A method according to claim 7, wherein the coolant is cooling water.

10. A method according to claim 1, wherein the workpiece is composed of a semiconductor single crystal ingot.

11. A wire saw slicing apparatus of the type including a plurality of main rollers rotatably supported at opposite ends thereof by pairs of bearing units and parallel spaced at predetermined intervals, and a wire wound spirally over and around the main rollers at a predetermined pitch so as to form a number of laterally spaced lines of wire stretched across a slicing zone defined between two adjacent ones of the main rollers, the lines of wire being reciprocally movable upon rotation of said main rollers to slice a workpiece into wafers as the workpiece is forced against the lines of wire in the slicing zone with a slurry continuously supplied to the lines of wire, wherein the improvement comprises: axial displacing means for controllably displacing each of the main rollers in the axial direction while the workpiece is being sliced.

12. A wire saw slicing apparatus according to claim 11, wherein said displacing means includes temperature regulating means for regulating the temperature of one of the pair of bearing units of each of the main rollers, said temperature regulating means including displacement detecting means for detecting an axial displacement of the corresponding main roller.

13. A wire saw slicing apparatus according to claim 11, wherein said axial displacing means includes first temperature regulating means for regulating the temperature of one of the pair of bearing units of each of the main rollers, second temperature regulating means for regulating the other of the pair of bearing units of a corresponding one of the main rollers, and displacement detecting means for detecting an axial displacement of said corresponding main roller.

14. A wire saw slicing apparatus according to claim 11, wherein said axial displacing means includes temperature regulating means for regulating the temperature of one of the pair of bearing units of each of the main rollers, said temperature regulating means including temperature detecting means for detecting the temperature of said one bearing unit.

15. A wire saw slicing apparatus according to claim 11, wherein said axial displacing means includes first temperature regulating means for regulating the temperature of one of the pair of bearing units of each of the main rollers, second temperature regulating means for regulating the other of the pair of bearing units of a corresponding one of the main rollers, and temperature detecting means for detecting the temperature of, at least, said one bearing unit of said corresponding main roller.

16. A wire saw slicing apparatus according to claim 11, wherein said axial displacing means is provided on one of the pair of bearing units of each of the main rollers, and the other bearing unit of the same main roller is provided with means for absorbing an axial displacement of said same main roller.

17. A wire saw slicing apparatus according to claim 12, wherein said temperature regulating means is composed of means for supplying a coolant to a corresponding one of the pair of bearing units, and a control valve for regulating the amount of the coolant supplied to said corresponding bearing unit.

18. A wire saw slicing apparatus according to claim 14, wherein said temperature regulating means is composed of means for supplying a coolant to a corresponding one of the pair of bearing units, and a control valve for regulating the amount of the coolant supplied to said corresponding bearing unit.

19. A wire saw slicing apparatus according to claim 17, wherein the coolant is cooling water.

20. A wire saw slicing apparatus according to claim 18, wherein the coolant is cooling water.

21. A wire saw slicing apparatus according to claim 11, wherein the workpiece is composed of a semiconductor single crystal ingot.

* * * * *